United States Patent
Kondo

[11] 3,855,462
[45] Dec. 17, 1974

[54] HEAD LIGHT ARRANGEMENT FOR A VEHICLE

[76] Inventor: Takasi Kondo, No. 25-5 Narita-Nisi, 1-Chome, Tokyo, Japan

[22] Filed: Jan. 23, 1973

[21] Appl. No.: 326,035

[52] U.S. Cl................................ 240/8.24, 240/2 S
[51] Int. Cl............................................... B60q 1/12
[58] Field of Search............ 240/8.24, 7.1 LJ, 7.1 R, 240/10.66, 2 S; 200/61.33, 61.53

[56] References Cited
UNITED STATES PATENTS

| | | | |
|---|---|---|---|
| 1,779,799 | 10/1930 | Blum............................ | 200/61.33 X |
| 1,964,212 | 6/1934 | Placke............................ | 200/61.33 |
| 1,995,236 | 3/1935 | Alcaraz............................ | 240/8.24 |
| 2,133,000 | 10/1938 | Trautner et al.................... | 240/8.24 |
| 2,536,828 | 1/1951 | Treese............................ | 240/8.24 X |
| 2,898,415 | 8/1959 | Clurman........................ | 200/61.53 X |
| 3,162,376 | 12/1964 | Furuya............................ | 240/10.66 |
| 3,567,918 | 3/1971 | Schable............................ | 240/8.24 |

Primary Examiner—Fred L. Braun
Assistant Examiner—E. M. O'Connor
Attorney, Agent, or Firm—Woodling, Krost, Granger & Rust

[57] ABSTRACT

A headlight arrangement for a vehicle comprising a pair of headlights each including a central light bulb and two lateral light bulbs disposed laterally of said central light bulb. When the vehicle is intended to turn in one direction, one of the lateral light bulbs as well as the central light bulb are energized to be illuminant in both of the intended and straightforward directions even before the vehicle is oriented in the intended direction.

3 Claims, 5 Drawing Figures

HEADLIGHT ARRANGEMENT FOR A VEHICLE

BACKGROUND OF THE INVENTION

Headlights for a car are designed to light upwardly or downwardly and it will be noted that they will light in a forward direction of the car. Therefore, when the car is intended to turn in one direction, for example, in a rightward direction to orient front wheels in the same direction, through the hand-wheel turned in a clockwise direction, headlights will light in a forward direction of the car during the car body oriented in a forward direction, due to which one cannot positively find obstacles lying forwardly of the car in rightwardly turned direction intended. In the prior art a single light-bulb for each of headlights is provided for angular movement thereof responsive to an intended direction of the car, but it would result in a complicated mechanism for orientation of the single light-bulb for each of the headlights, which causes the headlight arrangements to be expensive and impractical.

SUMMARY OF THE INVENTION

Accordingly, it is a principal object of the present invention to provide a headlight arrangement wherein a simple mechanism for illuminant orientation in an intended direction of the car is provided resulting in an inexpensive arrangement of headlights and elimination of a plurality of mechanical components.

It is a further object of the present invention to provide a headlight arrangement wherein headlights are adapted to be automatically illuminant in a desired direction responsive to steering operation in that direction.

In accordance with the present invention, there is provided a headlight arrangement for a vehicle comprising a pair of headlights each including a central light bulb and righthand and lefthand light bulbs disposed laterally of said central light bulb and reflector means for straightforward illumination of said central bulb and for rightward illumination of one of said righthand and lefthand light bulbs or for leftward illumination of the other light bulb, power source to energize said headlights, selective switching means to select the energization of said righthand and lefthand light bulbs, and an actuator for actuating said selective switching means to effect the selection of said righthand and lefthand light bulbs responsive to selected steering direction of said vehicle.

BRIEF DESCRIPTION OF THE DRAWINGS

The other objects and advantages of the present invention will be apparent to those skilled in the art from the reading of the following description in conjunction with the accompanying drawings.

DETAILED DESCRIPTION OF THE DISCLOSURE

Figure 1:
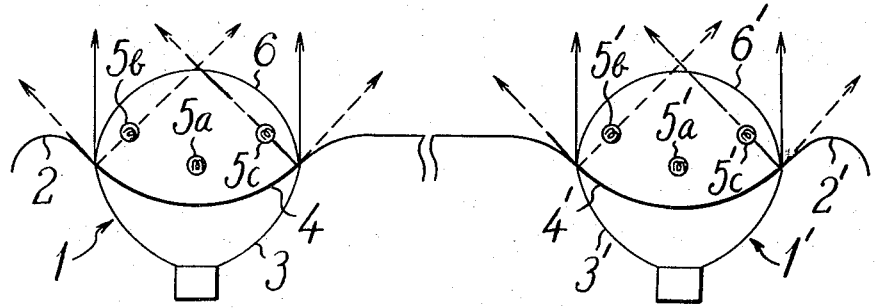
FIG. 1 is a schematic diagram in top view of a pair of headlights in accordance with the present invention.
Figure 5:
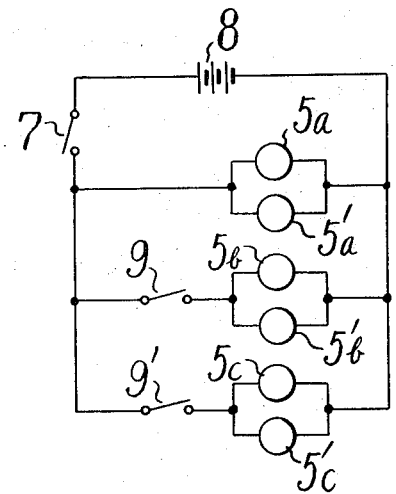
FIG. 5 is a schematic diagram illustrating an electrical circuit to energize the pair of headlights.

Referring now to FIG. 1, there are shown a pair of headlights 1 and 1' mounted on a frame (not shown) and surrounded by respective front fenders 2 and 2'. The headlight 1 comprises a semi-spherical frame 3, a reflector 4 secured to and adjacent to the front edge of the frame 3, three light bulbs 5a, 5b and 5c disposed ahead of the reflector 4 and a front lens 6 removably mounted on the frame 3 by any suitable means. One of the bulbs indicated at numeral 5a may be disposed at the center of the reflector 4 and the other light bulbs 5b and 5c may be disposed on either side of the center light bulb 5a. The light bulbs may be removably received in respective sockets (not shown) in a conventional manner, which in turn extend through and are secured to the reflector 4 at predetermined points thereof. The center light bulb 5a is adapted to light in a straightforward direction as indicated in a solid line when it is energized and the lefthand light bulb 5b is adapted to light in a rightward direction as indicated in a dotted line while the righthand light bulb 5c is adapted to light in a leftward direction as indicated in a dot-and-dash line. The headlight 1' also has the same construction as that of the headlight 1, in which the identical components are indicated at the identical numerals with the dashes added thereto. As shown in FIG. 5, the center light bulbs 5a and 5'a are in parallel connected through a lighting switch 7 to a battery 8. The lefthand light bulbs 5b and 5'b are in parallel connected through a selective switch 9 and the lighting switch 7 to the battery 8 while the righthand light bulbs 5c and 5'c are in parallel connected through a selective switch 9' and the lighting switch 7 to the battery 8. As described hereinafter, the selective switches 9 and 9' are arranged to be opened when the car moves in a straight direction while either one of them is arranged to be closed when the car is intended to turn in either of the rightward and leftward directions. Thus, when the car moves in a straight direction, then only the central light bulbs 5a and 5'a light while either righthand or lefthand bulbs as well as the central bulbs 5a and 5'a light depending upon the intended direction of the car.

Figure 3:
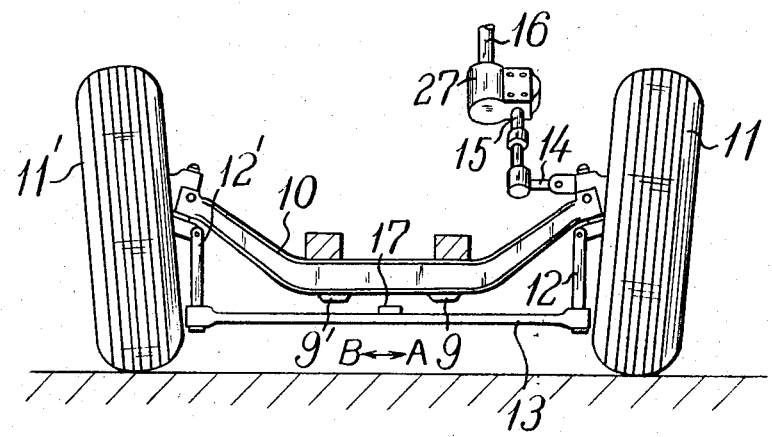
FIG. 3 is a schematically elevational view of steering mechanism into which are incorporated respective selective switching means for the pair of headlights and an actuator therefor.

Referring now to FIG. 3, there is illustrated an arrangement of the selective switches 9 and 9' which are mounted on a front axle 10 in offset positions and at the equal distances from the center of the axle. A pair of front wheels 11 and 11' are mounted on the respective ends of the front axle 10 in a conventional manner and knuckle arms 12 and 12' are mounted on the respective front wheels for desired orientation of the front wheels, which is conventional and will not be described in further details. The knuckle arms 12 and 12' are also connected to respective ends of a tie rod 13 and one of the knuckle arms 12, for example, may be pivotally connected to a drag link 14 which in turn is connected to one end of a pitman arm 15. The other end of the pitman arm 15 is connected to a gear shaft (not shown) which may in turn be rotated by a gear (not shown) in a gear box 27. Another gear engaged with the former gear in the gear box 27 may be connected to a lower end of a steering shaft 16 which in turn is connected at the upper end thereof to a steering wheel (not shown) in a conventional manner. An actuator 17 is secured to the tie rod 13 at the center thereof.

Figure 4:
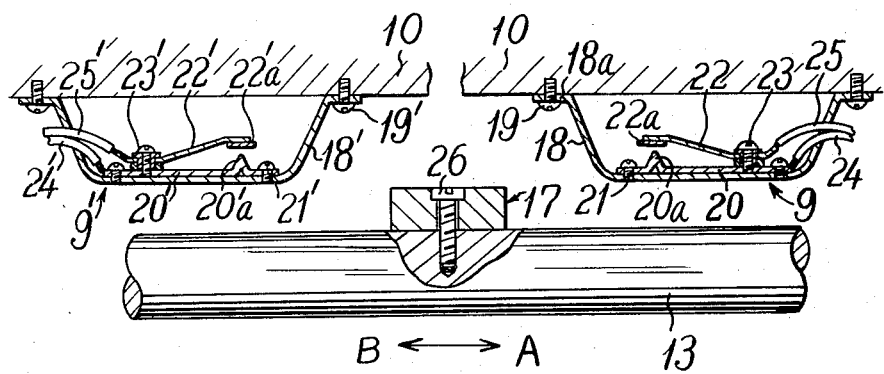
FIG. 4 is a cross sectional view of the selective switching means as shown in FIG. 3 and of the actuator together with a tie rod to which said actuator is secured.

The selective switches 9 and 9' and the actuator 17 are illustrated in more details in FIG. 4. In the illustrated embodiment, the selective switches 9 and 9' may be of a magnetic switch and accordingly, the actuator may be a permanent magnet. As apparent from FIG. 4, the selective switch 9 comprises a casing 18 formed of non-magnetic material such as synthetic resin which is secured at the periphery thereof to the surface of the front axle by means of screws 19 extending through the flange 18a of the casing and threaded into the threaded hole of the front axle 10. A non-magnetic conductor plate 20 is disposed within and secured to the casing 18 by means of screws 21 with a contact 20a formed of a protrusion on the conductor plate 20. A movable plate 22 which may be formed of non-magnetic leaf spring may be secured at the base portion thereof to the conductor plate 20 by means of screws 23 in an insulative relationship to the conductor plate 20 and is provided with a magnetic contact 22a in an opposite relationship to the contact 20a of the conductor plate 20. Both of the conductor plate 20 and the movable plate 22 have the respective leads 24 and 25 soldered thereto, which extend through the hole of the casing 18 to be connected to the corresponding light bulbs and the lighting switch 7 as shown in FIG. 5. The selective switch 9' has the identical construction to that of the switch 9, in which the identical components are indicated at the identical numerals with the dashes added thereto. The actuator 17 may comprise a permanent magnet which is secured to the surface of the tie rod 13 by means of a screw 26 extending through the magnet and the tie rod 13 and threaded into the latter.

When the car moves in a straightforward direction, then the actuator 17 is sufficiently far from either of the selective switches 9 and 9' and as a result they remain open as shown in FIG. 4. When the car is intended to turn in a rightward direction, then the tie rod 13 moves in a direction as indicated at an arrow A and therefore causes the actuator 17 to be moved toward the selective switch 9 so that it is closed, thereby energizing the left-hand light bulbs 5b and 5'b. Therefore, the operator can look in that direction as well as in the straight direction even before the body of the car actually turn in the intended direction. On the other hand, when the car is intended to turn in a leftward direction, then the tie rod 13 moves in a direction as indicated at an arrow B and therefore causes the actuator 17 to be moved toward the selective switch 9' so that it is closed, thereby energizing the right-hand light bulbs 5c and 5'c. Therefore, the operator can look in the intended direction as well as in the straight direction even before the body of the car turns in the intended direction. When the steering wheel and hence the tie rod 13 are returned to the original position, then the actuator 17 moves far away from the selective switch 9 or 9' to deenergize the righthand or the lefthand light bulbs.

Figure 2:
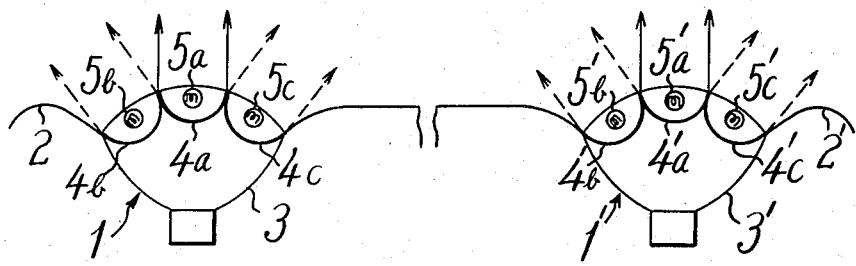
FIG. 2 is a schematic diagram in top view of a pair of modified headlights in accordance with the present invention.

Referring now to FIG. 2, there is a shown a modification of the headlights arrangement in accordance with the present invention, in which the light bulbs have the respective reflectors 4a, 4b, 4a, 4'a, 4'b and 4'c. It should be noted that the lefthand light bulbs 5b and 5'b, when energized, light in the leftward direction rather than in the rightward direction while the righthand light bulbs 5c and 5'c, when illuminated, light in the rightward direction rather than in the leftward direction. Accordingly, it will be understood that the selective switch 9 as shown in FIG. 5 should be connected to the light bulbs 5c and 5'c while the selective switch 9' as shown in FIG. 5 should be connected to the light bulbs 5b and 5'b. Since the construction and operation of such modification is substantially identical to the previous embodiment in other respects, it will be unnecessary to describe them in further detail.

During the running of the car, it is sometime intended to change the running path in the same direction, but at such time the steering wheel is rotated only at a slight agree, such as less than 180° agree, for example, which unaffects the operation of both selective switches 9 and 9'. Thus, the lateral light bulbs 5b, 5'b, 5c and 5'c remain unlighted and therefore, will not obstruct the operation of the oppesely facing cars.

While the present invention has been disclosed by means of preferred embodiments with reference to the accompanying drawings, it is to be understood that numerous modifications and changes may be made in the construction and operation of the illustrated embodiments. For example, the selective switches 9 and 9' may be disposed at any point adjacent to the portion of the steering system movable responsive to the steering operation of the car. It should be noted that such modified arrangement of the selective switches is intended to be included within the range of the present invention without departing from the spirit and scope thereof, as defined in the appended claims.

What is claimed is:

1. A headlight arrangement for a vehicle having a steering system including a front axle and a tie rod, comprising a pair of headlights each including a central light bulb and right-hand and left-hand light bulbs disposed laterally of said central light bulb and reflector means for each of said headlights, said reflector means each arranged so that illumination from each of said central light bulb is directed in a straightforward direction, and illumination from one of said right-hand and left-hand light bulbs of each of said headlights is directed in a rightward direction, and illumination from the other of each of said right-hand and left-hand light bulbs of each of said headlights is directed in a leftward direction; a power source to energize said head lights; selective switching means to select the energization of said right-hand and left-hand light bulbs of each of said headlights; and an actuator for actuating said selective switching means to effect the selection of said right-hand and left-hand light bulbs of each of said headlights responsive to steering movement of a steering system of said vehicle said selective switching means comprises two magnetically operated switches mounted on a front axle of said steering system in a spaced relationship to each other and wherein said actuator comprises a permanent magnet mounted on a tie rod of said steering system intermediate of said spaced magnetically operated switches, said spaced relationship to each other of said two magnetically operated switches being so that one of said switches is operated by said permanent magnet when the latter together with said tie rod moves a sufficient distance for said vehicle to turn the corner of the road on which said vehicle is running.

2. A headlight arrangement for a vehicle having a front axle and a tie rod comprising a pair of headlights each including a central light bulb and a righthand and a lefthand light bulb disposed laterally of said central light bulb, and reflector means comprising a single reflector for each of said headlights disposed to the rear of said central, righthand and lefthand light bulbs so that illumination from each of said central light bulbs is directed in a straightward direction, and illumination from each of said righthand light bulbs is directed in a leftward direction and illumination from each of said said lefthand light bulbs is directed in a rightward direction, a power source to energize said head lights, selective switching means to select the energization of said righthand and lefthand light bulbs, said means comprising two magnetic switches of such a type that they are made closed when they lie in the magnetic field, an actuator magnet for selectively closing said magnetic switches to effect the selection of said lateral light bulbs responsive to selected steering direction of said vehicle, and said magnetic switches being mounted on a front axle of said vehicle in a spaced relationship to each other and said actuator being mounted on a tie rod of said vehicle for movement between said spaced magnetic switches.

3. A headlight arrangement for a vehicle having a front axle and a tie rod, comprising a pair of headlights each including a central light bulb and a righthand and lefthand light bulb disposed laterally of said central light bulb and reflector means comprising three reflectors for each of said headlights disposed to the rear of illumination from each of said central light bulbs is directed in a straightward direction, and illumination from each of said righthand light bulbs is directed in a rightward direction, and illumination from each of said lefthand light bulbs is directed in a leftward direction, have a light, a power source to energize said head lights, selective switching means to select the energization of said righthand and lefthand light bulbs, said selective switching means comprising two magnetic switches capable of being selectively closed, an actuator of a permanent magnet for selectively closing to effect the selection of said righthand and lefthand light bulbs responsive to selected steering direction of said vehicle, and said magnetic switches being mounted on a front axle of said vehicle in a spaced relationship to each other and said actuator being mounted on a tie rod of said vehicle for movement between said spaced magnetic switches.

* * * * *